May 18, 1954
R. B. KING
2,678,750
EXTERNAL TANK CONSTRUCTION
Filed July 26, 1949
3 Sheets-Sheet 1
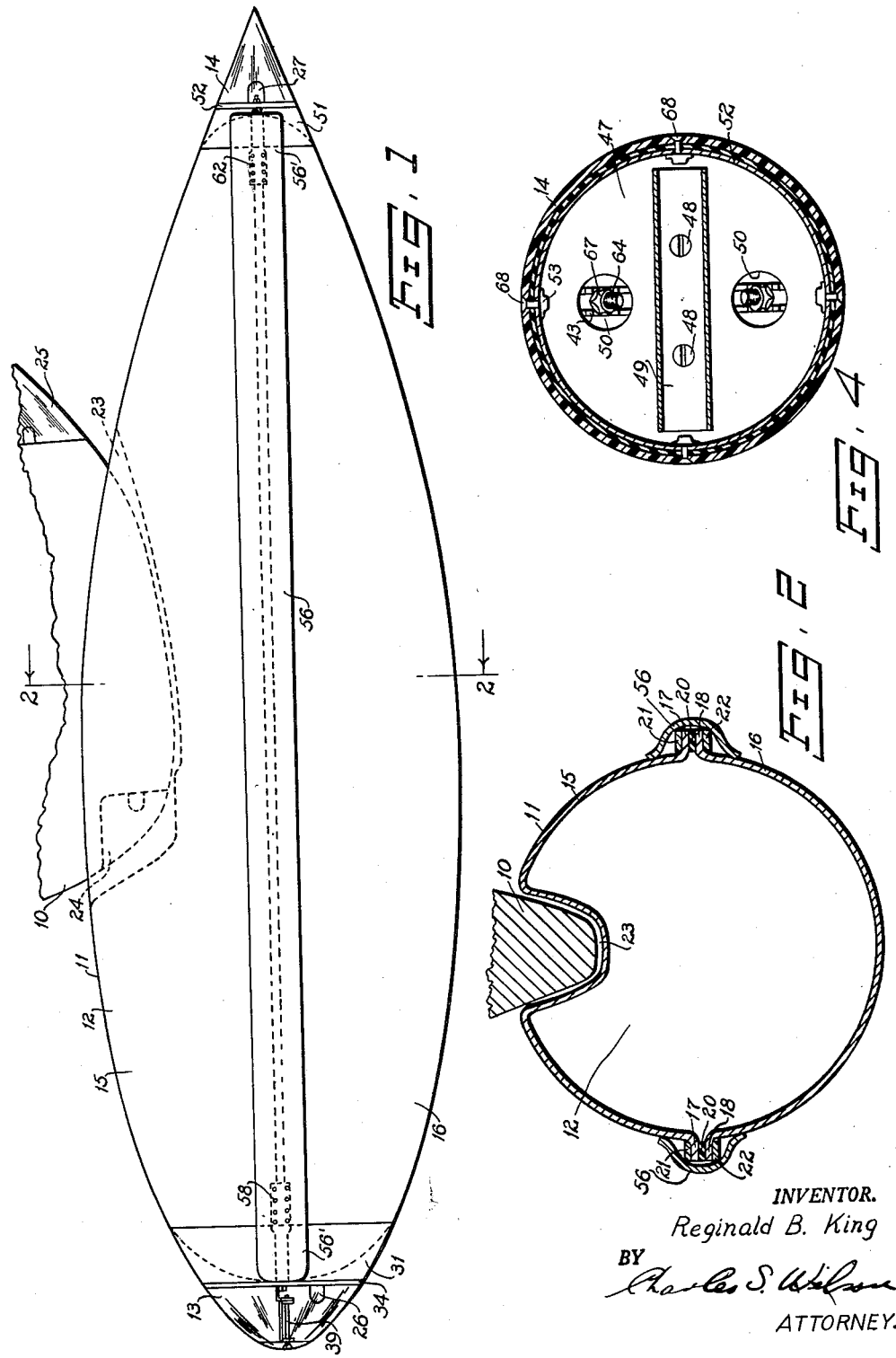
INVENTOR.
Reginald B. King
BY
ATTORNEY.

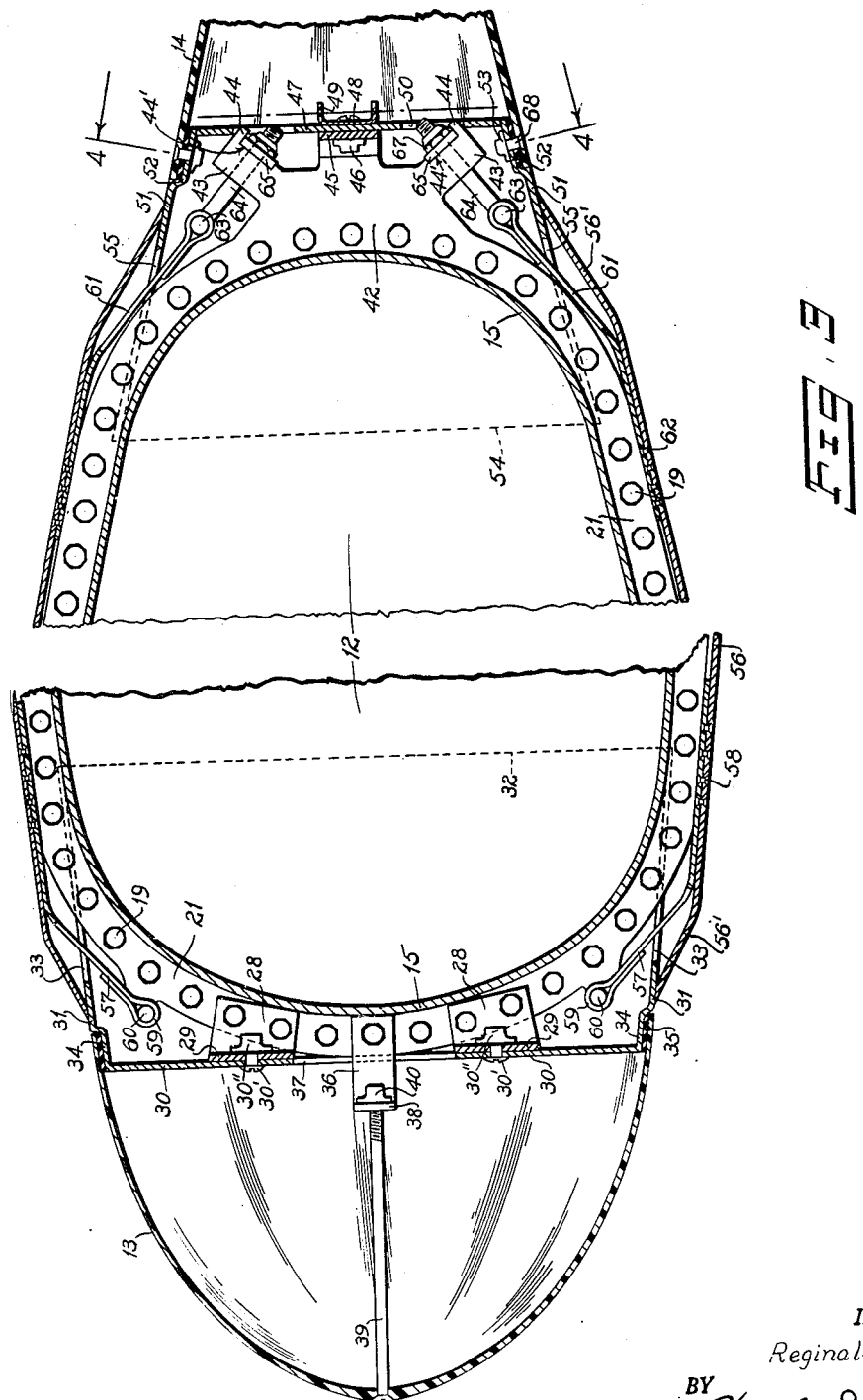

May 18, 1954 R. B. KING 2,678,750
EXTERNAL TANK CONSTRUCTION
Filed July 26, 1949 3 Sheets-Sheet 3
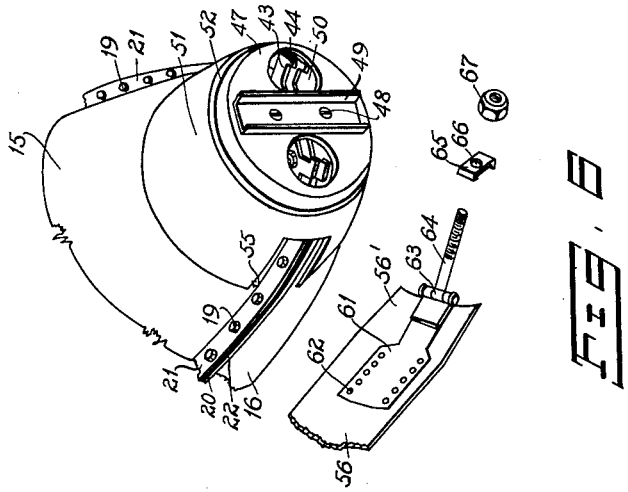
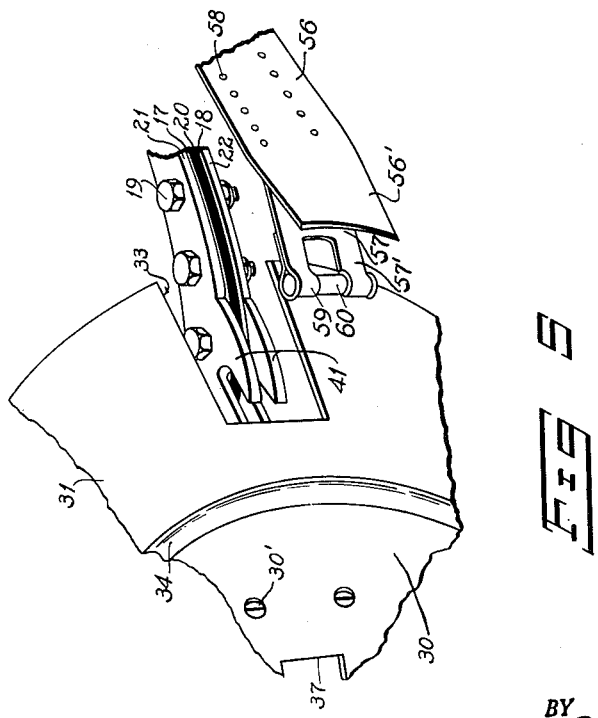
INVENTOR.
Reginald B. King
BY
ATTORNEY.

Patented May 18, 1954

2,678,750

UNITED STATES PATENT OFFICE 2,678,750

EXTERNAL TANK CONSTRUCTION

Reginald B. King, Douglaston, N. Y., assignor to Republic Aviation Corporation, near Farmingdale, N. Y., a corporation of Delaware Application July 26, 1949, Serial No. 106,773

20 Claims. (Cl. 220—5)

This invention relates generally to aircraft and more particularly has to do with the construction of auxiliary containers or tanks for external association with a wing or other structural component of the aircraft.

Among its other objects the present invention proposes a tank construction that, having a clean and uninterrupted aerodynamic contour, will develop little or no drag and which, because of its form and shape, will improve rather than adversely affect the flight characteristics of an airplane with which it is associated.

Since an auxiliary tank or container of the kind herein contemplated is situated in the air stream when in operative association with an aircraft component, it is an object of this invention to fair or cover all structural parts or elements normally forming irregularities on the tank contour and which otherwise would be exposed to, or project into, the air stream in flight and thereby cause or develop turbulence. In short, the instant invention has in view so covering or fairing structural elements projecting from the tank surface that they are not only concealed but are, in effect, joined smoothly with and constitute a continuation of the tank surface.

Another feature of the instant tank assembly resides in the removable attachment of fairing elements to the tank and in the complete concealment of the means by which these fairing elements are attached or secured to the tank.

Where in mounting an auxiliary tank in operative association with an aircraft component, such as a wing, some essential and normally exposed member incorporated in the wing structure, such as a navigation light, is concealed or hidden by the tank. This invention includes in its assembly a substitute for such member that performs all of the functions of the covered member so long as the tank remains associated with said component.

While the present tank assembly is constructed so as to structurally withstand all of the internal fluid forces imposed upon it by the contained fuel and the external aerodynamic pressures and loads imposed upon it during flight, its particular construction also adapts it for quick and easy assembly or dismantling for repair or service operations.

With the above and other objects in view, as will be apparent, this invention consists in the construction, combination and arrangement of parts, all as hereinafter more fully described, claimed and illustrated in the accompanying drawings, wherein:

Fig. 1 is a plan view of an auxiliary tank constructed according to the instant invention showing it mounted on, or associated with, the tip of an aircraft wing;

Fig. 2 is a transverse section through the tank taken along line 2—2 of Fig. 1 and discloses the assembly of the tank halves and the fairings covering the seam or junction between these halves;

Fig. 3 is an enlarged broken or fragmentary longitudinal section taken through the tank and illustrates the mounting and attachment of the end cones and the longitudinal fairings on and to the tank;

Fig. 4 is a transverse section taken along line 4—4 of Fig. 3 to illustrate the mounting of the aft end cone on the tank and the means by which longitudinal fairings are secured to the tank structure inwardly of that cone;

Fig. 5 is an exploded perspective view showing part of the forward end of the tank and the means by which a longitudinal fairing is secured at that end to the tank structure; and Fig. 6 is an exploded perspective of part of the aft end of the tank to disclose the means and manner of attaching the aft end of the same fairing to the tank structure.

It is well known that the range or radius of action of an aircraft is a function of the available fuel supply and it is equally well known that the amount of internal fuel an aircraft may carry is directly limited to and by the space available within the aircraft and its components for fuel storage. Heretofore, when a proposed flight exceeded the range or radius of action possible with the internal or normal fuel supply, auxiliary fuel tanks were suspended from or attached to the wings and/or fuselage of the aircraft. These auxiliary tanks could remain attached to the aircraft after being emptied or could be jettisoned at the option of the pilot. Whether ultimately jettisoned or not, the auxiliary tanks, when in place on the aircraft, were and are disposed in the air stream and subjected to the same external loads, stresses and pressures as the components of the aircraft. Additionally, these tanks must support and sustain the loads imposed upon them by their fuel contents.

The present trend in aircraft design, especially in military aircraft of interceptor or fighter type, is to position the auxiliary tanks at the tips of the wings (either suspended directly under, or centrally disposed to surround or engage the tip) thereby leaving the under surfaces of the wings and fuselage clear for the support of offensive weapons, such as bombs or rockets, and at the same time improving the flight characteristics of the airplane. When an auxiliary tank is positioned parallel to the chord of the wing at and around the wing tip it, in effect, constitutes an enlarged continuation of both surfaces of the wing and covers and conceals, in whole or in part, the navigation lights customarily positioned at the leading and trailing edges of the wing tip.

It is the purpose of the present invention to provide a tank assembly which includes fore and aft navigation lights to act as substitutes for the corresponding lights permanently incorporated in the wing tip so long as the auxiliary tank may be associated with the wing tip. Also this tank assembly contemplates a structure capable of withstanding all internal and external loads, stresses and pressures to which it may be subjected and be so assembled and faired that a smooth, clean external tank surface is produced regardless of the tank structure and the provision of fore and aft navigation lights at the extremities of the tank.

Reference being had more particularly to the drawings, 10 designates the wing tip of an aircraft upon which the present tank assembly or auxiliary container 11 may be mounted. While the tank assembly 11 is shown and described herein as being particularly adapted for mounting on and in part surrounding the wing tip 10, it is to be understood and will be hereinafter evident that the same tank construction or assembly, with little change or modification, can be adapted for external mounting at any point on any component of an aircraft.

In general the tank assembly 11 comprises a storage compartment 12 defined by the complemental shells or tank sections 15 and 16 combined with a nose or forward section 13 and a tail or aft section 14.

The storage or fuel compartment 12 is formed by uniting an inboard shell 15 with an outboard shell 16, that are provided at their respective edges with outstanding peripheral flanges 17 and 18. Each of these flanges 17 and 18 is pierced by a series of openings so arranged that the openings of one flange register with the companion openings of the other flange when the shells 15 and 16 are united. The flanges 17 and 18 of the complemental shells 15 and 16 are adapted to be joined or fastened together by bolts 19 projecting through the registered openings provided as aforesaid in the flanges. In order to prevent leakage at the seam or joint between the shells 15 and 16, a sealing gasket 20 having the same dimensions and contour as the flanges 17 and 18 is disposed between the inner surfaces thereof and when so placed it is pierced by the bolts 19 in the final assembly of the tank being provided with openings in registration with the openings in the flanges 17 and 18 for that purpose.

Reinforcing and clamping rings 21 and 22 having substantially the same dimensions and shape as the flanges 17 and 18 and the gasket 20 are positioned flush against the outer surfaces of the flanges 17 and 18 respectively. These reinforcing and clamping rings 21 and 22 each comprise a unitary structure which is coextensive with and rests flush against the outer surface of its adjoining flange 17 or 18. To secure the rings 21 and 22 in their operative positions in conjunction with the flanges 17 and 18 they too are provided with openings which register with the openings in the flanges 17 and 18, whereby the bolts 19 may be projected through the rings 21 and 22 as well as the flanges 17 and 18 and gasket 20.

In this manner a leak-proof joint is established between and at the abutting edges of the complemental shells 15 and 16. Because of the structural strength required of the union between the shells 15 and 16 and to provide ready accessibility to the interior of the fuel compartment 12, a continuous, outstanding projection, consisting of flanges 17 and 18, gasket 20, rings 21 and 22 and bolts 19, results from the assembly of the tank 12 and this projection extends completely around the tank in approximate alignment with its longitudinal axis since the tank as a whole is symmetrical relative to this axis. Access may be had to the interior of the tank 12 by removing the bolts 19 and then separating the shells 15 and 16.

In order to provide a housing for the means used to mount the auxiliary tank assembly 11 on the wing tip 10 or on any other component of an aircraft, the inboard shell 15 is provided medially of its length with a cavity or well 23. When the tank is positioned in operative association with an aircraft component, the extremity of the wing tip 10, or in the alternative, the attaching means by which the tank is mounted elsewhere on the aircraft, together with any sway braces and connections for the fuel, pressure and electrical lines are all received and housed within this well 23. Of course the well 23 may be entirely eliminated if desired, without departure from the scope hereof and in this event the shells 15 and 16 are duplicates.

It will be apparent that when the tank assembly 11 is mounted on the wing tip 10, the forward and aft running or navigation lights 24 and 25 respectively, permanently incorporated in the leading and trailing edges of the wing tip 10 will be positioned, in whole or in part within the well 23 or will be otherwise concealed by the tank. To provide substitutes on the tank assembly 11 for these lights 24 and 25 of the wing, running or navigation lights 26 and 27 are mounted in any suitable manner in the ends of the tank assembly 11, viz., the nose and aft sections 13 and 14, these lights being effective when the tank is mounted on the wing tip 10. The nose and tail sections 13 and 14 of the tank are hollow and constructed of clear glass, synthetic resin or other suitable material and the fore and aft lights 26 and 27 are respectively, contained and housed therein.

The clamping rings 21 and 22 in addition to reinforcing the flanges 17 and 18 of the tank 12 also include means for mounting the nose and tail sections 13 and 14 respectively on the tank 12 and for anchoring the fairings which are associated with the projecting seam or joint between the shells 15 and 16 consisting of the gasket 20, flanges 17 and 18 and the rings 21 and 22. To that end the forward end of the tank 12 has a pair of brackets 28 secured to the outer surface of each ring 21—22. These brackets 28 are spaced laterally one from the other on the rings from the longitudinal axis of the tank and the brackets secured to the ring 21 are in alignment with the similar brackets secured to ring 22. The outer extremity of each of these brackets is bent at right angles in a direction away from the rings 21 and 22 to create an angularly disposed attaching flange 29. When so formed and positioned, the flanges 29 of all of the brackets 28 rest in a common plane normal to the longitudinal axis of the tank. Thus, the flanges 29 supported on and attached to the rings 21—22 provide a means whereby an end plate 30 may be attached to the forward end of the tank 12 by the screws 30′ piercing the plate and flanges 29 to engage plate nuts or other securing means 30″ fixed to faces of the flanges 29 opposed to the plate 30.

This end plate 30 is circular and at its periphery is provided with an outwardly flared skirt 31 which embraces and at its free edge bears snugly, as at 32, against the outer surface of the tank 12. To accommodate and permit the passage of the projecting joint or union between the shells 15 and 16 formed by the flanges 17—18 and associated rings 21 and 22, the skirt 31 is provided with a pair of diametrically disposed slots 33 each of which extends from a point adjacent the plate 30 to and through the outer edge of said skirt. Thus, when the skirt or fairing 31 is in its operative position on the forward end of the tank, the forward portion of the joint between the shells 15 and 16 is continued within the space defined by the skirt, while the remainder thereof passes outwardly through these slots 33 to be concealed and covered by fairings attached to the rings 21 and 22, through these slots 33, as will be hereinafter more fully described.

The portion of the skirt 31 immediately adjoining the plate 30 is depressed inwardly and circumferentially to form a shoulder 34 which serves as a seat for the edge of the nose section 13. The nose section 13 is, as above pointed out, hollow and parabolic in section. At its edge the nose section 13 is adapted to be seated in the depression in the skirt and to abut the shoulder 34 of the skirt 31. A strip of rubber or similar cushioning material 35 is interposed between the edge of the nose section 13 and the skirt 31. To secure the nose section 13 in place, a central bracket 36 is attached to one of the rings 21 or 22 by one or more of the bolts 19 and extends forward through an opening 37 in the plate 30. At its outer end the bracket 36 is provided with a lateral or mounting plate 38 having an aperture therein and a plate nut 40 attached to its inner surface in registration with said aperture. A bolt 39 centrally pierces the nose section 13 on the longitudinal axis of the tank to be threaded at its inner end into the plate nut 40. In this manner, the nose section 13, end plate 30 and skirt 31 are secured in place as a unit to house and contain all of the equipment and parts situated in the space defined by the elements.

Within the space defined by the skirt 31 of the plate 30 and in alignment with each slot or aperture 33 therein, each of the rings 21 and 22 is provided with a hook 41 formed integrally therewith and opening toward the plate 30. These hooks 41 are arranged in pairs and these pairs are arranged equidistantly upon each side of the longitudinal axis of the tank with the companion hooks aligned transversely of the rings 21 and 22. By this arrangement a pair of corresponding hooks 41, formed integrally with the rings 21 and 22, are provided adjacent the skirt 31 and in alignment with each slot 33 therein. The utility and purpose of these hooks will hereinafter be apparent.

At the opposite end of the tank and in association with the tail section 14, the rings 21—22 are each provided with an extension 42 formed integrally therewith and projecting beyond the limits of the flanges 17 and 18 at that point. This extension 42 on each ring 21 and 22 is relatively wide and is disposed symmetrically relative to the longitudinal axis of the tank and in alignment transversely of said rings with the extension of the companion nut. Each extension has a pair of ears 43, formed integrally thereon and projecting outwardly from the opposed ends of the extension. A lug 44 is formed to project at right angles to one edge of each ear and in combination with that edge forms a recess 44′. Between the ears 43, each extension 42 is provided with a central bracket 45 disposed substantially at right angles to the plane of the extension 42 and having a plate nut 46 secured to its inner surface. The ears 43 and central bracket 45 of one ring respectively, align transversely of the planes of the rings with the corresponding ears 43 and bracket 45 of the opposed ring. Thus, the ears 43 of the several rings 21—22 coact to form mounting or connecting means for the fairings covering the projecting union between the shells 15 and 16 to be hereinafter more fully described, while the brackets 45 serve to attach a circular end plate 47 to the tank 12.

The end plate 47 is attached and held in place by bolts 48 piercing it and a bracing U-bar 49 mounted on the outer face of the end plate 47 to engage the plate nuts 46 secured to the inner surfaces of the brackets 45. Additionally the end plate 47 is provided with a pair of access openings 50 on opposite sides of the U-bar 49, the purpose of which will be hereinafter more fully explained. At its edge, the end plate 47 is provided with a skirt 51 that is similar in form and function to the skirt 31 of the forward end plate 30. Adjacent the point where the skirt 51 joins the plate 47 the skirt is depressed to produce a shoulder 52 and to the inner surface of the skirt 51 adjacent this shoulder 52, a series of plate nuts 53 are welded or otherwise fixedly secured. When the plate 47 is attached to the bracket 45 the edge 54 of the skirt 51 is in bearing contact with the outer surface of the wall of the tank 12 and to permit the passage of the projecting seam formed by the joining of the shells 15 and 16, the skirt 51 is provided with a pair of diametrically opposed slots or openings 55.

Thus, when the nose section 13 and the end plate 30 together with the skirt 31 carried thereby are assembled, as aforesaid, on the brackets 36 and 28 with the edge 32 of the skirt bearing against the body of the tank, and when the plate 47 and its skirt 51 is secured to the brackets 45 by the bolts 48, the forward and aft portions of the projecting seam formed by the union of the shells 15 and 16 are disposed within the spaces defined by the skirts 31 and 51 to be completely housed and covered thereby. However, those portions of the projecting joint between the inner ends of the slots or openings 33 and 55 respectively of the skirts 31 and 51 are completely exposed. In order to cover or fair each of these exposed portions a longitudinal fairing 56 is disposed above and completely covers each exposed part of this joint or union between the shells 15 and 16. This fairing 56 comprises a relatively narrow strip of spring metal slightly curved or convexed in cross-section and having its end portions 56′ bent inwardly toward the longitudinal axis of the tank 12.

This fairing strip 56 is positioned over an exposed portion of the projecting joint formed by the union of the shells 15 and 16 with its extremities 56′ extending beyond and over the slots 33 and 55 of the skirts 31 and 51 respectively, to bear against the exposed surfaces of these skirts (see Fig. 3). Adjacent one end and inwardly of the angularly disposed end portion 56', the strip 56 is provided with a front hanger strap 57 riveted, welded, or otherwise secured flush against the inner surface of the strip as at 58. This hanger strap 57 is bifurcated at its free extremity to create the spaced arms 57', which in turn are bent upon themselves and have their terminals welded or otherwise permanently secured to the strap 57 to thereby form the aligned housings 59 in which the ends of a pin 60 are received and held. The front hanger strap 57, when the fairing or strip 56 is in its operative position, projects through the adjacent opening or slot 33 in the skirt 31 so that the pin 60 is engaged by a pair of the hooks 41 located within the space defined by the skirt 31. It is by this arrangement that the forward end of each fairing 56 is attached to both of the rings 21 and 22 within the space defined by the skirt 31 and at the same time, the openings or slots 33 in the skirt 31 are each covered and concealed by an angular end 56' of the fairing 56. When the forward ends of the fairing strips 56 are so assembled the extremities of the angular ends 56' resiliently bear against the outer surface of the skirt 31 beyond the inner ends of the slots 33 while the body of the strip spans the union between the shells 15 and 16.

The opposite end of each fairing 56 is provided with a rear hanger strap 61, that is riveted or otherwise permanently secured, as at 62, to the inner surface of the strip 56 inwardly of the angularly disposed terminal 56' thereof. A bolt 63 is pivotally mounted in a loop 61' formed at the outer extremity of this rear hanger strap 61 and the threaded shank 64 thereof is adapted to be positioned between and project beyond a pair of the spaced ears 43 of the extensions 42. A bearing plate or bridge 65, having a central opening 66 for the free passage of the shank of the bolt 63 is adapted to span the coacting ears 43 in opposition to the rear hanger strap 61 and bear on the edges of said ears inwardly of the lugs 46 which prevents any sliding movement of the bridge 65 along the edges of said ears. To hold these elements in their operative positions a nut 67 is threaded on that part of the shank 64 of the bolt 63 which projects beyond the bearing plate or bridge 65. As this nut 67 is threaded inwardly of the shank 64 it contacts and bears against the bridge 65 and draws the shank of the bolt 63 through the bridge and the strip 56, to which the bolt 63 is attached, is thereby placed under tension. The continued rotation of the nut 67 increases the tension on the strip 56 thereby forcing the longitudinal side edge thereof into tight bearing contact with the outer surfaces of the shells 15 and 16 as shown in Fig. 2. When the strips 56 are thus positioned under tension, the projecting portions of the joint between the shells 15 and 16 situated between the slots 33 and 55 of the skirts 31 and 51 respectively, are completely covered or housed by the two strips or fairings 56. The angularly disposed ends 56' at the extremities of each strip 56 are, by the tension placed on the strip 56 as above described, brought into bearing contact with the exposed surfaces of the skirts 31 and 51 and serve to close or cover the slots 33 and 55 in the skirts as aforesaid. In this manner, the projecting joint or seam formed by the union of the shells 15 and 16 is completely faired or housed by the strips 56 and the skirts or fairings 31 and 51 coacting with these strips, so that a smooth, clean and unbroken aerodynamic surface is established.

The aft section 14 of the tank is hollow and conical in form and is positioned with its edge portion seated in the depression in the skirt 51 and against the shoulder 52 where it is secured by screws 68 projecting through apertures in the wall of the section 14 to engage the plate nuts 53 underlying the shoulder or depression 52. To prevent any projection of these screws 68 beyond the surface of tail or aft section 14 their heads are countersunk.

From the foregoing it becomes manifest that after the tank 12 is assembled, the forward end plate 30 and its skirt 31 is positioned on the forward or leading end of the tank 12 and is there secured by the bolts 30' projecting through the attaching flanges 29 of the brackets 28 to engage the plate nuts attached to or mounted on these flanges. The nose section 13 can then be put in place with its edge portion resting in the depression in the skirt 31 and against the shoulder 34 resulting from this depression, after which it may be fixed in place by the concentric bolt 39 having its end threaded into the plate nut 40 carried by the plate 33. The aft end plate 47 and its skirt 51 is then secured in position by engaging the bolts or screws 48 into the plate nuts 46, and when thus secured, the openings 50 are located to provide access to the ears 43 of the extensions 42 and the nuts 67 of the strips 56 through the rear or aft end plate.

The two opposed strips or fairings 56 can then be positioned over the exposed joint or union between the shells 15 and 16 when the forward ends thereof are anchored to the rings 21 and 22 by passing the hanger straps 57 through the slots 33 in the skirt 31 and engaging the pins 60 carried by the front end of the hanger strap 57 with the double hooks 41 located within the space defined by the nose or forward section 13.

The aft ends of the fairings or strips 56 are then anchored to the rings 21 and 22 by passing the aft hanger straps 61 through the slots 55 in the skirt 51 to locate the shanks 64 of the bolts 63 between the pairs of ears 43 in alignment with the slots 55. The threaded portion of each shank 64 will thereby be aligned with and adjacent to one of the openings 50 in the rear end plate 47, whereupon a bridge or bearing plate 65 and nut 67 are placed on the shank 64 working through the openings 50 in the end plate. As the nuts 67 are tightened on the shanks 64 and against the bridges or bearing plates 65, the fairings or strips 56 are placed under tension and are brought into intimate, sealing contact with the walls of the shells 15 and 16 along their longitudinal edges. The fore and aft angularly disposed end portions 56' of each fairing or strip 56 are at the same time and by the same means brought into close sealing contact with the outer surfaces of the skirts 31 and 51.

Finally the conical aft section 14, is placed in position by seating the inner edge portion thereof on the shoulder 52 of the skirt 51 to be secured into this position by the screws 68 piercing the edge portion of the aft section 14 and engaging the plate nuts 53 underlying the shoulder 52 of the skirt 51.

From the foregoing, it is apparent that all means of attachment for the end sections 13 and 14 and for the fairings or strips 56, except the head of the bolt 39 and the heads of the screws 68 are completely covered or concealed and that the heads of these members are countersunk in the coacting surfaces of the forward and aft sections 13 and 14 respectively, and therefore an optimum clean, aerodynamic surface is provided for the assembly. By reversing the foregoing procedure of assembly, the tank assembly may be dismantled to provide access to the interior of the tank 12 if that be desirable.

What is claimed is:

1. The combination with a sectional container having its sections united by a projecting seam, of a fairing to cover and conceal said seam comprising a relatively narrow strip substantially coextensive with the seam, means for attaching the ends of said strip to the container with its longitudinal edges in free bearing and merging contact with the surface of the container on opposite sides of the seam, and means at each end of the container forming unbroken continuations of the surface thereof for housing and concealing said attaching means.

2. The combination with a sectional container having its sections united by a projecting seam, of a fairing to cover and conceal said seam comprising a relatively narrow strip substantially coextensive with the seam, means for attaching the ends of said strip to the container and placing the strip under longitudinal tension with its longitudinal edges in bearing and merging contact with the surface of the container on opposite sides of the seam, and means associated with the container and forming an unbroken continuation of the surface thereof to house and conceal said attaching means.

3. The combination with an elongated container composed of two mating sections united by abutting flanges establishing a projecting seam extending lengthwise completely around the container, of an individual fairing on each longitudinal side of the container to cover and conceal a major portion of said seam comprising a relatively narrow strip adapted to transversely span the seam, means located at each end of the container to so secure the ends of each strip to the container that the opposed longitudinal edges thereof merge with the surface of the container on opposite sides of the seam, and means associated with each end of the container to conceal said attaching means.

4. The combination with an elongated container composed of two mating sections united by a projecting seam extending lengthwise completely around the container, of an independent fairing to cover and conceal the major portion of said seam on each side of the container comprising a relatively narrow strip coextensive with the portion of the seam to be covered and adapted to transversely span the seam, means located at the ends of the container to secure the ends of each strip to the container, and means associated with said attaching means to place said strip under tension with its opposed longitudinal edges in merging contact with the surface of the container on opposite sides of the seam.

5. The combination with an elongated container composed of two mating sections united by a projecting seam extending lengthwise completely around the container, of an independent fairing to cover and conceal the major portion of said seam on each side of the container comprising a relatively narrow strip coextensive with the portion of the seam to be covered and adapted to transversely span the seam, means located at the ends of the container to secure the ends of each strip to the container, means associated with said attaching means to place said strip under tension with its opposed longitudinal edges in merging contact with the surface of the container on opposite sides of the seam, and a houstainer on each end of the container to conceal and cover said attaching and associated means and organized and arranged to form a merging continuation of the surface of the container.

6. The combination with a body having an external projecting member, of a fairing for said projecting member comprising a strip substantially coextensive with said member, securing means fixedly associated with the end portions of said projecting member, and attaching means carried by the ends of said strip for inter-engagement with said securing means, the attaching means at one end of the strip embodying a device to place the strip under longitudinal tension and thereby bring its longitudinal edges into bearing contact with the surface of the body on opposite sides of the projecting member.

7. A tank comprising a plurality of mating, hollow shells each having an outstanding peripheral flange to rest in flush surface abutment with the flange of a complemental shell, a reinforcing ring to rest against the outer surface of each flange, means for uniting the flanges and reinforcing rings to form a unitary joint between the shells, a forward end-plate fixedly secured to the forward portion of said joint, a skirt extending rearwardly from said forward end plate to embrace the tank adjacent its forward end, a nose section cooperating with the forward end plate to form a flush continuation of its skirt, a rear end plate fixedly secured to the rear portion of said joint, a skirt extending forwardly from said rear end plate to embrace the tank adjacent its rear end, means for fairing the portion of said joint extending between the forward and rear skirts, and a tail section cooperating with the rear end plate to form a flush continuation of its skirt.

8. A tank comprising two complemental shells each having an outstanding peripheral flange, a clamping ring to bear externally on each of said flanges, said flanges and rings being united to establish a projecting joint between the shells, a nose section carried by the forward portion of said joint, a nose fairing interposed between the nose section and the tank whereby the nose section and fairing combine to form a continuous surface merging with the surface of the tank, a rear section carried by the rear portion of the joint, a rear fairing interposed between the rear section and the tank whereby the rear section and fairing combine to form a continuous surface merging with the surface of the tank, and a pair of opposed fairings to house those portions of the joint exposed between said nose and rear fairings.

9. A tank comprising a plurality of complemental shells each having an outstanding peripheral flange, reinforcing rings coextensive with each of said flanges, said flanges and rings combining to form a union between the shells, a forward section carried by said reinforcing ring including a forward fairing to house the forward end portion of the tank, an aft section carried by said reinforcing ring, including an aft fairing to house the aft end portion of the tank, and fairings attached to said reinforcing members to cover those portions of the union between the shells exposed between the forward and aft fairings aforesaid.

10. A tank comprising two hollow, elongated complemental shells, an outstanding peripheral flange formed on each of said shells, the flanges of the shells being disposed substantially parallel one to the other, a clamping member positioned on and coextensive with the outer surface of each of said flanges, means passing through said flanges and clamping members for securing said shells one to the other and to create a projecting unitary joint between them, a forward end plate mounted on the forward portion of said joint, a skirt on said end plate extending rearwardly to embrace and merge with the adjacent outer surfaces of the shells, said skirt having diametrically opposed slots therein for the passage of the joint, a nose section mounted on and forming a continuation of the skirt, means for attaching said nose section to the aforesaid joint, a rear end plate mounted on the aft portion of said joint, a skirt extending forwardly from said rear end plate to embrace and merge with the adjacent outer surfaces of the shells, said skirt having diametrically opposed slots therein for the passage of the joint, fastening and anchoring means associated with the forward and aft portions of the joint, a strip to be disposed over the joint, means carried by the forward and aft end portions of said strip for cooperation with the fastening and anchoring means, one of said means constituting a tension device for placing and maintaning the strip aforesaid under tension, and a tail section secured to the rear end plate and forming a continuation of the skirt thereof.

11. A tank comprising two hollow, elongated, complemental shells, an outstanding peripheral flange formed on each of said shells, the flange of one shell being disposed in substantial flush surface abutment with the flange of its complemental shell, a clamping ring disposed on and coextensive with the outer surface of each of said flanges, bolts piercing said flanges and clamping rings for removably securing said shells one to the other and to create a projecting unitary joint between them, an end plate disposed at each end of the tank normal to the longitudinal axis thereof, a skirt on each of said end plates to bear against and form a merging continuation of the adjacent surfaces of the shells, each of said skirts having diametrically opposed slots for the passage of the aforesaid joint into the space defined by the skirt, a transversely curved strip on each side of the container extending between the aligned slots in said skirts, anchoring and attaching means within the space defined by each skirt in alignment with each of said slots, securing means attached to the inner surface of the strip inwardly of its ends to pass through the adjacent slot for cooperation with the anchoring and attaching means, each end portion of the strip projecting beyond the securing means bearing in merging contact on the outer surface of the skirt over a slot therein, and means associated with one end of each strip to place the strip under tension and thereby bring its longitudinal edges into bearing and merging contact with the outer surfaces of the shells upon each side of the joint.

12. A tank comprising two hollow, elongated, complemental shells, an outstanding peripheral flange formed on each of said shells, the flange of one shell being disposed in substantial flush surface abutment with the flange of the complemental shell, a clamping ring disposed on and coextensive with the outer surface of each of said flanges, bolts piercing said flanges and clamping rings for removably securing said shells one to the other thereby creating a projecting unitary joint between them, an end plate disposed at each extremity of the tank normal to the longitudinal axis thereof, a skirt on each of said end plates projecting over the adjacent end portion of the tank to bear against and form a merging continuation of the adjacent surface of the tank, each of said skirts having diametrically opposed slots to permit the passage of the joint through the skirt into the space defined by the skirt, a transversely curved relatively narrow strip on each side of the container disposed over the exposed part of the joint extending between a pair of slots in said skirts aligned one with the other longitudinally of the tank, an anchoring and attaching means disposed within the space defined by each skirt in association with each slot in the skirt, securing means attached to the inner surface of the strip inwardly of its ends to pass through the adjacent slot for cooperation with the anchoring and attaching means, the end portion of the strip beyond the securing means extending over and bearing against the outer surface of the skirt to cover the slot, end sections, one being associated with each of the aforesaid end plates to form an unbroken continuation of the outer surface of the skirt of its associated end plate, and means cooperating with each strip for placing it under tension and thereby bring its longitudinal edges into bearing and merging contact with the surfaces of the shells on each side of the joint aforesaid.

13. The combination with a tank formed of complemental sections united by an outwardly projecting continuous joint, of a clamping ring disposed on each side of said joint and secured thereto, an end plate normal to the longitudinal axis of the tank secured to said clamping rings at each end of the tank, an end fairing projecting inwardly from the periphery of each end plate to bear at its edge against the surface of the tank and form a continuation thereof, each fairing being provided with a pair of opposed slots through which the joint passes, a hook formed on the clamping rings within one of said fairings in alignment with each slot therein, a bracket formed on the clamping rings within the other of said fairings in alignment with each slot therein, a fairing strip overlying each exposed part of the joint located between the fairings aforesaid with its end portions extending over the fairings and covering the aligned slots therein, and attaching means secured to the inner faces of said fairing strip to pass through the slots in the end fairings for cooperation with the hooks and brackets on the clamping rings.

14. The combination with an elongated tank formed of two complemental shells united by an outwardly projecting peripheral joint, of securing means at each end of the tank, a relatively narrow strip substantially coextensive with and adapted to house the joint on each side of the longitudinal axis of the tank, attaching means carried by the ends of said strip for inter-engagement with the aforesaid securing means, said attaching means embodying a tension device to place said strip under longitudinal tension whereby the edges thereof are brought into merging and bearing contact with said tank adjacent said joint.

15. The combination with an elongated tank formed of two complemental shells united by an outwardly projecting peripheral joint, of fixed securing means at each end of the tank, a strip of spring material transversely convexed disposed over said joint, attaching means at the ends of said strip to be interengaged with the securing means to mount said strip in its operative position, and means for placing said strip under longitudinal tension to bring its longitudinal edges into bearing contact with the surfaces of the shells on opposed sides of the joint.

16. The combination with an elongated tank formed of two complemental shells united by an outwardly projecting peripheral joint, of securing means fixedly mounted on each end of the tank in cooperation with said joint, a strip of spring metal bowed in section to overlie the joint with its longitudinal edges disposed over the tank surface on each side of the joint and attaching means attached to said strip adjacent its end for coaction with said securing means to mount the strip in its operative position, at least one of said attaching means including a device for placing the strip under longitudinal tension to bring its edges into free bearing contact with the surfaces of the tank on opposite sides of the joint.

17. The combination with a seam joining convex surfaces, of a strip arranged to overlie and house said seam with its longitudinal edges disposed on opposite sides thereof, securing and anchoring means for the ends of said strip fixed against movement relative to said surfaces, attaching means carried by the strip at its ends for interengagement with the securing and anchoring means, and means operating between the attaching means and the securing means aforesaid for placing the strip under tension to bring the surface of the strip into substantial mergence with the convex surfaces aforesaid upon opposite sides of the seam.

18. The combination with a seam uniting convex surfaces, of a transversely curved strip arranged to overlie said seam with its longitudinal edges disposed on opposite sides thereof, and independent means for securing each end of the strip to said surfaces, each said means including means for placing the strip under longitudinal tension and thereby bring the edges thereof into bearing contact with said convex surfaces upon opposite sides of the seam and its surface into substantial mergence with convex surfaces.

19. The combination with an elongated, hollow tank, of an end section associated with each end of the tank, and a fairing interposed between each end section and the adjoining end portion of the tank enclosing each end portion of the tank and attached to the tank and to the associated end section to form a flush continuation of the surfaces of both.

20. The combination with an elongated, hollow tank having convexed tapered ends, of a tapered transparent end section associated with each end of the tank, and a fairing enclosing each end portion of the tank and interposed between each end section and the adjoining end of the tank, said fairing being secured to the tank and associated end section to constitute a flush continuation of the surfaces of both.

References Cited in the file of this patent

UNITED STATES PATENTS

| Number | Name | Date |
|---|---|---|
| 984,086 | Graham | Feb. 14, 1911 |
| 1,595,633 | Thwaits | Aug. 10, 1926 |
| 1,622,205 | Paulus et al. | Mar. 22, 1927 |
| 1,817,653 | Thaden | Aug. 4, 1931 |
| 2,134,260 | Nickerson | Oct. 25, 1938 |
| 2,249,497 | Samons | July 15, 1941 |
| 2,471,296 | Allen et al. | May 24, 1949 |

FOREIGN PATENTS

| Number | Country | Date |
|---|---|---|
| 448,639 | France | Dec. 2, 1912 |
| 557,582 | France | May 8, 1923 |